Nov. 18, 1941. P. CARVALLO 2,262,921
APPARATUS FOR THE THERMAL TREATMENT OF FOOD PRODUCTS OR THE LIKE
Filed Oct. 12, 1937 3 Sheets-Sheet 1
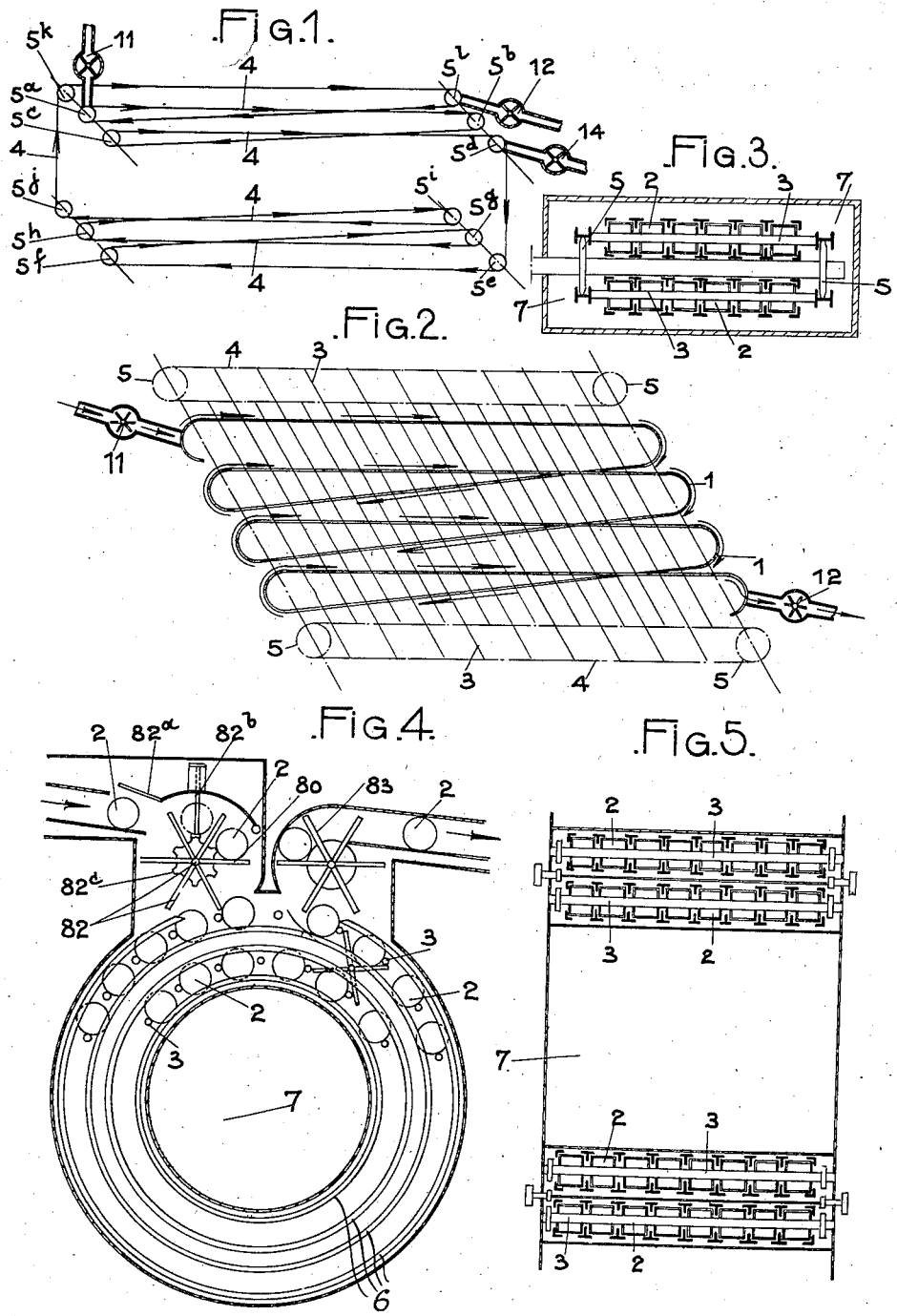
INVENTOR:
PIERRE CARVALLO
BY Haseltine, Lake & Co.
ATTORNEYS

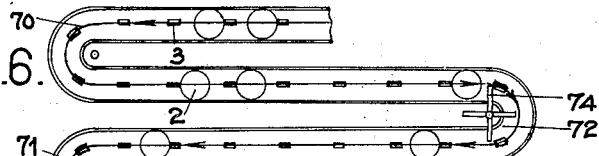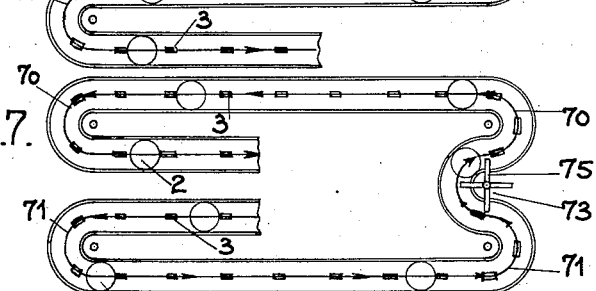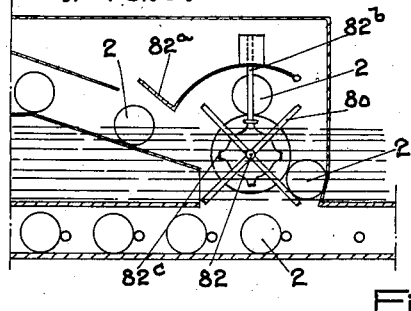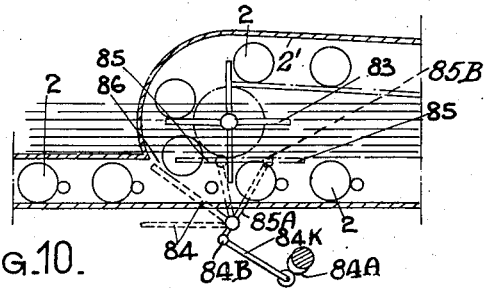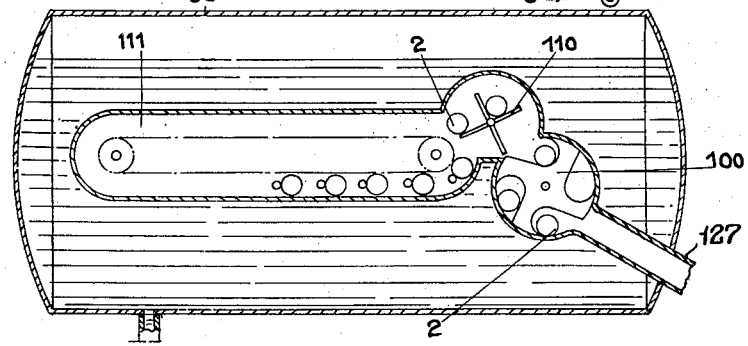

Nov. 18, 1941.　　　P. CARVALLO　　　2,262,921
APPARATUS FOR THE THERMAL TREATMENT OF FOOD PRODUCTS OR THE LIKE
Filed Oct. 12, 1937　　　3 Sheets-Sheet 3
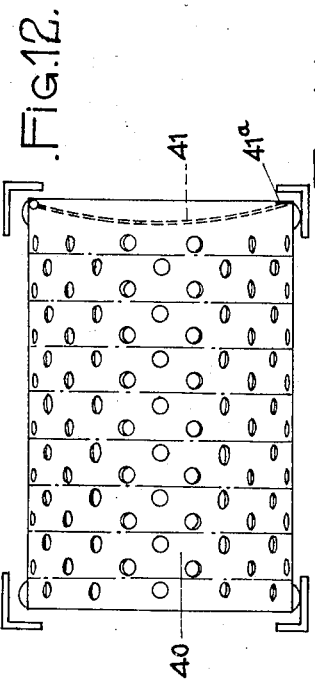
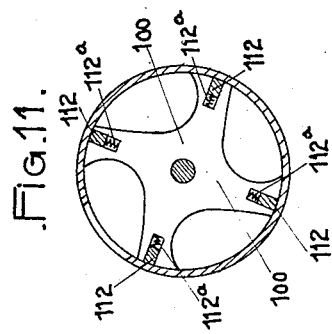
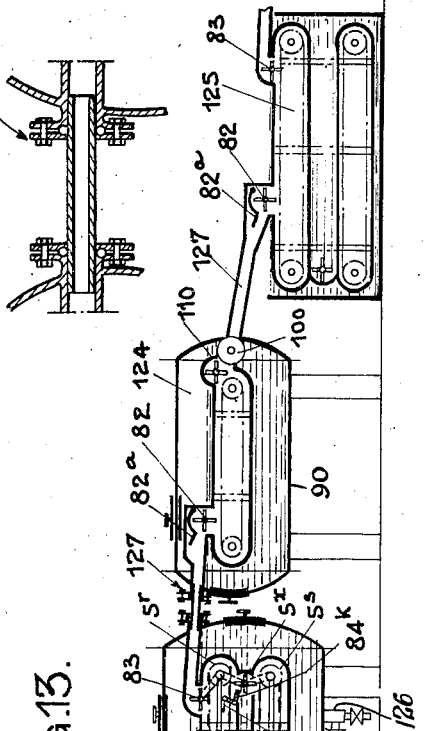
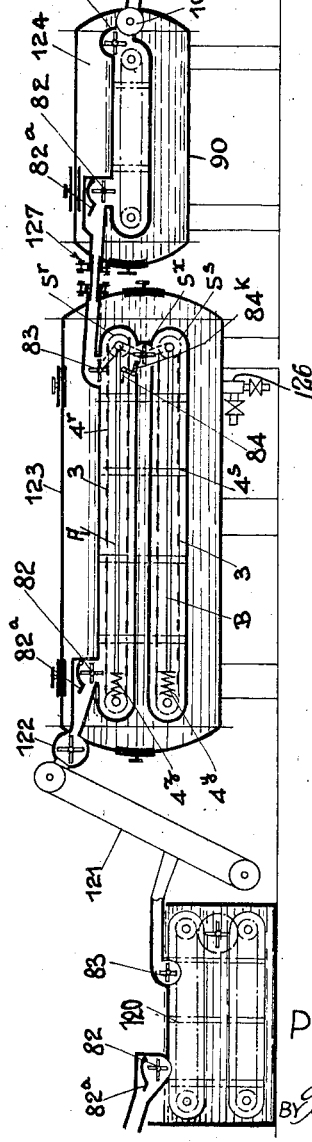
INVENTOR:
PIERRE CARVALLO
BY Haseltine, Lake & Co.
ATTORNEYS Patented Nov. 18, 1941

2,262,921

UNITED STATES PATENT OFFICE 2,262,921

APPARATUS FOR THE THERMAL TREATMENT OF FOOD PRODUCTS OR THE LIKE

Pierre Carvallo, Amposta, Spain

Application October 12, 1937, Serial No. 168,567
In France October 15, 1936

4 Claims. (Cl. 126—272)

The present invention has for object: an improved apparatus for the thermal treatment of food products or the like and particularly for the sterilization of preserved foods.

The invention allows the construction of machines included in the category of continuous sterilising coolers of the agitation or stirring type. In apparatus of this kind, actually in use, the agitation or stirring is irregular, relatively slow, difficultly controllable and not very efficient. The solutions and improvements proposed according to the invention allow of obtaining for each product and dimensions of vessel the optimum conditions for thermal penetration throughout the mass of the product.

This efficient agitation or stirring allows of treating the products at higher temperatures, the total duration of the treatment being, by this apparatus, reduced to a considerable degree.

The apparatus thus allows of obtaining raw products, that is foods which have not been subjected to an appreciable cooking capable of destroying the vitamines, the flavour and other natural properties of the products.

Certain products such as preserved foods in general and particularly milk and products derived therefrom, fruit juices and tomato juices, etc., may be designated as "Raw sterilized products" or "Live sterilized products" or "Natural sterilized products" or "White sterilized products" (milk and products derived therefrom).

The invention can be characterised by the following points applied separately or in any combinations:

(a) Use is made of circulation channels constituting at least one continuous circuit and in which cylindrical vessels can roll; these channels can be closed by any means, angle irons, flat irons, sheet metal, etc. The vessels can be propelled along these channels by means of a chain or bar.

In chain propulsion, the rolling of the vessels can be effected by the action of driving fingers mounted on chains extending all along the circulation channels, the latter forming a closed endless circuit.

In bar propulsion, which constitutes the preferred embodiment, the advancement is effected particularly by causing the vessels to be pushed along these channels by bars, cylindrical or not, provided or not with rollers. These bars are held and driven at their ends by driving members, chains, crowns, etc. which constitute two parallel endless circuits.

In this system, the channel can be constituted by a single turn closed so as to form an endless circuit, or by several turns forming an open circuit. Several similar circuits can be connected in series, in parallel, in enclosing circuits, or be combined so as to form an endless closed circuit.

(b) The vessels previously defined are introduced in vats containing the treatment fluids. If the treatment is effected under pressure, the vats are preferably cylindrical and fluid-tight distributors allow the admission and discharge of the vessels. The vanes of these distributors are preferably provided with spring-pressed fluid-tight blades.

(c) The invention also extends to the arrangement comprising the feeding by selecting distributors, applicable to all the closed propulsion circuits. This arrangement allows particularly of increasing the speed of translation and of rotation of the vessel. In fact, for the satisfactory utilisation of the apparatus previously indicated, all the compartments constituted by the driving members, must be occupied. It results therefrom that, for instance for an output of D cylindrical vessels per minute, the speed of rotation of the vessel is about $D/2.5$ ($D/\pi$ corrected for the necessary clearances). This speed may be too small. It could be increased by lengthening the rolling track which would then be used but partially, this solution can be replaced by selective distribution. Assuming that it is desired to multiply this speed by 6, the endless circuit must be so devised as to form in all, for instance, $6N \pm 1$ compartments. The admission distributor will deliver a vessel and the outlet distributor will discharge a vessel every 6 compartments. It is obvious that an adequate synchronism of both distributors and of the driving mechanism will allow each vessel to effect six times the complete circuit before being discharged, that is to say for an equal time of passage in the apparatus, to have a speed of travel and also of rotation six times greater.

(d) At least two open circuits are coupled by star-shaped propelling members for the passage from one circuit to the other and reversely so as to establish a closed circuit.

(e) Introduction in selective or non-selective manner can be obtained through the medium of star-shaped members controlled from the exterior or preferably by the chain driving the bars, this introduction device can be provided with a brake controlled by cams.

(f) The discharge whether selective or non-selective controlled by the member driving the bars, comprises, in the first case, an extracting lever and a slide-block controlled by a cam or the like.

(g) The outlet fluid-tight delivery-valve is capable of acting as an air compressor.

(h) In order to be capable of treating in the apparatus described vessels of all shapes and dimensions, small cylindrical baskets are provided made of perforated sheet metal or the like, into which are introduced one or more of the vessels containing the product to be treated. These baskets form the treatment unit which passes automatically through the apparatus.

(i) According to the invention an installation can be established, constituted by a sterilizing and cooling unit, this unit comprising several heating stages and several cooling stages, the two upper stages working, preferably at the same pressure.

(j) The improvements according to the invention allow:

Of working with a liquid fluid entirely covering the circuits followed by the vessel.

Of working with high or excess pressure which is advantageous at high temperatures.

Better balancing of the internal and external pressures.

High speeds of rotation necessary for certain products.

The invention also extends to other particular points which will appear in the following description with reference to the accompanying drawings, given by way of example only, and in which:

Fig. 1 is a diagram of a circuit with chain propulsion.

Fig. 2 is a diagram of an open circuit having several turns in a double stage arrangement with propulsion by means of bars.

Fig. 3 is a sectional view of a machine constructed according to Fig. 2.

Fig. 4 is a cross section of a cylindrical two-stage apparatus.

Fig. 5 is a longitudinal section of a cylindrical two-stage apparatus.

Figs. 6 and 7 show the coupling of two circuits by means of star-shaped members for the passage from one circuit to the other.

Fig. 8 illustrates a star-shaped member for the introduction of vessels to be treated.

Fig. 9 shows a star-shaped member for the extraction of vessels.

Fig. 10 shows a delivery valve for the extraction of vessels mounted on a cooler.

Fig. 11 is a detail view of the delivery valve.

Fig. 12 is a sectional view of a basket in which are contained vessels of any shape.

Fig. 13 is a general view of an installation.

Fig. 14 shows a section of a tubular connection in Fig. 13.

Fig. 1 shows a diagram of an installation comprising a single endless chain 4 which passes successively over the wheels 5a, 5b . . . 5₁, 5ₐ. The admission is effected by the distributor 11 and the discharge by the different distributors such as 12 or 14, the circulation of the vessels being indicated by the arrows.

The turns and consequently the wheels 5 can be provided in any number whatever. One of the turns can be raised for allowing the discharge above the level of the treatment fluid if the latter is a liquid.

This type of installation which necessitates a chain of great length is advantageous only for a single closed turn, or for a double circuit of two or three turns.

Fig. 2 is a diagram showing the travel or advancement of the vessels which are pushed by bars 3 secured at their ends on chains 4 passing over chain wheels 5. The circulation channel 1 constitutes an open circuit comprising a single double stage having any number whatever of turns. The bars 3 can be provided with rollers or tubes which can rotate on the bars in contact with the vessels. The movement of the bars 3 compels each vessel to follow the channel 1, in the direction of the arrows, these vessels rolling in the channel in proportion as they move.

Fig. 3 is a cross section corresponding to Fig. 2 and does not necessitate any special description.

Similar circuits can be grouped in series, in parallel or be coupled so as to constitute an endless circuit. They can also be concentrically coupled. A particular case is that which comprises circular circuits as shown in Figs. 4 and 5. Another particular case is that in which the circuit 1 comprises only one endless turn, this very simple circuit being particularly suitable with or without selective distribution for the treatment of small outputs of large size vessels.

Fig. 4 is a cross section and Fig. 5 a longitudinal section of a cylindrical apparatus having several stages of several turns. This device has the guide tracks 6, but gives less regularity in the rotation of the vessels than the devices previously described which present paths, almost all of which are horizontal, nevertheless it will often be sufficient and the periods during which the vessel does not rotate are sufficiently short for allowing this device to benefit in certain cases from the advantages of the rotation previously described.

The apparatus thus devised are externally very similar to rotary sterilizing apparatus currently used particularly in America, but the principle of advancement of the tins is different and offers numerous advantages: very reduced cumbersomeness owing to the possibility of providing several concentric stages, more rational advance of the vessel which moves nearly always by rotating instead of doing so mainly by a longitudinal movement of translation as in the ordinary apparatus, very active rotation of the vessel which takes place in nearly the entire circumference.

In this new embodiment, the admission 11 and the discharge 12 can take place at any point whatever of the external or internal stage and the circuit can be varied in numerous ways and established as previously indicated, either in an open circuit, or in a closed circuit, the latter being suitable for selective distribution.

The apparatus previously described are devised with their rotation axes horizontally arranged, in order to ensure the rotation of each cylindrical vessel or container about its proper axis arranged horizontally or nearly horizontal.

Figs. 6 and 7 respectively illustrate the front end and the rear end of an installation comprising two open circuits 70 and 71 provided particularly with propulsion bars 3. These two circuits are connected at 72 and 73 by star-shaped members 74 and 75 so that the whole forms a closed circuit.

These two star-shaped members can be mounted on the same shaft which can drive at the same time, the wheels controlling the chains of both circuits.

In Fig. 8, the star-shaped member 80 for introducing the vessels receives each vessel 2 and engages it in synchronism with the rolling track. This device is particularly advantageous for treatment in a liquid fluid, the reduced gravity of the vessel in this medium being unable, with this process, to cause irregularities in the operation. In this figure, the vessel arrives by gravity.

By reducing a certain number of the vanes of the star-shaped member or by providing this star with a suitable number of branches, selective feeding can be obtained.

The star-shaped member 80 is mounted on the shaft 82 which can be synchronously controlled in any manner whatever and particularly by the member driving the bars. A brake 82$^a$, movable about the shaft 82$^b$, checks the arrival of each vessel to avoid a too violent impact against the star-shaped member 80. This brake is preferably controlled by a cam 82$^c$ having a number of bosses equal to the number of working branches of the star-shaped member.

In Fig. 9, a similar extraction star 83 will extract a vessel only if the lever 84 is lifted by a cam 84A shifting arm 84K, at the same time as a slide-block 85 shifted by a second arm 85$a$ connected at 85B to slide 85 opens or closes the passage 86. This extraction device consisting mainly of lever 84 and arms 84K and 85A centered on pivot shaft 84B therefore allows selective distribution; moreover, it allows the discharge of the vessels from the apparatus above the level of the liquid from the upper level 2' of the circuit of the apparatus in case a liquid fluid is used for the treatment.

These star-shaped members will be provided with a variable number of propelling branches or arms according to the desired selection combinations.

In Figure 10 is shown diagrammatically a portion of the apparatus illustrated as a complete assemblage in Figure 13 with particular emphasis on a valve 100 used for extracting or delivering the containers or vessels within a continuous cooler 90. This valve is adapted to have several functions, one being to discharge the containers and another to evacuate a certain quantity of water which may enter the portion forming the circuit of travel of the containers at the point of entry of the vessels together with the latter if so desired (see Figure 13), and also to introduce and compress a certain volume of air within the apparatus which this valve may take in through the delivery pipe 127.

In this figure the rotary supply valve 100 as already mentioned, discharges the vessels 2 and a portion of the cooling water. This triple use is particularly advantageous by the simplicity and the economy it ensures.

The supply valve 100 (Fig. 10) is combined with a star-shaped feeding member 110 which ensures the passage in synchronism from the rolling track 111, towards the supply-valve 100.

The peripheral fluid-tightness of the supply-valves is obtained by blades 112 pressed by springs 112$^a$ as illustrated in Fig. 11, and lateral fluid-tightness is improved by a labyrinth system.

Fig. 12 illustrates a small cylindrical basket 40 made of perforated sheet metal or the like forming the treatment unit which automatically passes through the machine.

Vessels of all shapes 212 are piled up in this basket 40 which includes a rapid closing and locking system, for instance the flat spring 41 held by the claw 41$^a$.

Fig. 13 shows a complete sterilizing and cooling installation according to the invention. The vessel delivery means 84, 84K etc., within tank 123 resemble the parts shown in Fig. 9. This installation comprises, at 120, a temperature raiser with an open vat, an elevator at 121 combined with a delivery-valve 122 feeding a temperature raiser with a closed vat 123. Moreover, a temperature reducer with closed vat is provided at 124 and a temperature reducer with open vat is arranged at 125.

In this drawing, the internal mechanism of the vats 123 is constituted by two circuits A and B as in Figs. 2 and 3 with driving by means of horizontal bars 3 mounted on pins carried by endless chains 4$^r$ and 4$^s$ driven by the wheels 5$^r$ and 5$^s$, actuated by gears through the shaft 5$^x$ controlled from the exterior and which carries the star-shaped members for the passage from one circuit to the other, connecting both circuits and the cam which, by means of the link 84$^k$ actuates the extraction lever 84. The introduction and extraction, selective or non-selective, according to the desired speed of rotation is effected by the star-shaped members 82 and 83 controlled by wheels driven by the chain 4$^r$ or by gears rigid with the chain wheels. At 4$^z$ and 4$^y$ are provided tighteners for the endless chains; these tighteners act simultaneously on the shafts of the chain wheels and on the rolling tracks which are slidably mounted, so as not to modify the relative position of these elements.

This unit, particularly suitable for the treatment according to the invention at approximately 130° C., comprises two stages for raising the temperature and two stages for lowering the temperature, allowing a better balancing of the internal and external pressures. Moreover, the cooling in two stages allows of obtaining a considerable economy in cooling fluid, the cooling water from the second apparatus passing into the first apparatus.

Preferably, and the invention includes this arrangement in its scope, the vats 123 and 124 work at the same pressure, the passage from one to the other taking place freely, a cushion of compressed air sustained by the compressor valve 126 preventing condensation in 124 of the steam from 123. This device offers, among others, the advantage of operating with a slight overpressure and, moreover, of diminishing the total loss of steam through the inlet supply-valve owing to the air added. The compressed air can also be admitted by any means, and the over-pressure can be increased in order to effect the treatment at higher temperatures.

The air compressed by the outlet supply-valve can be trapped, by means of suitable partitioning not shown without being mixed with steam, within the vat so as to be able to itself actuate the temperature adjuster. This device avoids a special accessory for effecting this control.

The passage from 123 to 124 preferably takes place by means of a rolling track not shown slidably mounted within a fluid-tight tube provided with a resilient seal such as 127. This device allows the relative movements of the vats and facilitates the assemblage and resistance to expansion.

The vats 123 and 124 if desired can also be replaced by a single vat provided with an insulating partition.

The vats illustrated are cylindrical vats of great capacity which offer the following advantages: lightness of construction, great capacity of treating fluid allowing a rigorous constancy of temperature, easy access through manholes to all the mechanism without the necessity of taking to pieces.

The elevator for the tins 121 is made of sheet metal entirely closed so as to recover the steam escaping from the supply-valve 122 which thus reheats the vessels during their passage in the elevator. In this manner the temperature raiser 120 can be dispensed with in many cases.

The whole of the means described allows of working with a liquid fluid covering entirely the circuits through which the tins travel allowing operation at high or excess pressure and producing an efficiency very superior to steam for a continuous apparatus. In fact, in such an apparatus using steam, the valves for the admission and discharge of the tins systematically introduce volumes of air which are impossible to blow off and the mixture of which with the steam considerably diminishes its heating efficiency. The present device allows, moreover, the use of very high speeds of rotation necessary for certain products.

The apparatus according to the invention which, by the short duration of treatment, allows of preserving nearly entirely the properties of the products treated, is particularly advantageous for delicate liquids, in particular fruit juices, tomato juice, etc., various natural or prepared drinks, etc., which preserve their colour, their flavour, their vitamines.

By way of example, a particularly advantageous application will be described in detail, which consists in the treatment of ordinary milk, condensed milk, and products derived therefrom.

Owing to the apparatus according to the invention, the milk is brought as rapidly as possible and at a high speed of rotation, to the treatment temperature, in contrast with the usual technique which normally dictates progressive heating and a minimum of rotation as well in a fixed or rotary discontinuous digester as in a continuous digester.

By treatment at approximately 120° to 130° C., perfect sterilization will be obtained, the milk having, in all, been subjected to more than 100° only for about 2 to 8 minutes according to the speed adopted and to the temperature chosen.

These figures can vary with circumstances (composition contamination) and are given by way of example only and for allowing them to be compared with the times used in actual industrial continuous or discontinuous processes, in which the milk is subjected to more than 100° C. during 15 to 40 minutes at speeds of rotation of from 20 down to zero revolutions per minute. The sterilized milk thus obtained has lost many properties (among others, flavour and colour) which are, on the contrary, preserved by the new process.

The application of this use will allow the very desirable general sterilization of all milk distributed to the public, allowing the milk to be stocked at ordinary temperatures in small, medium, and large tins, avoiding refrigerating installations, provisioning by night, etc.

In particular, this apparatus offers a practical solution to the nourishment of children.

For that purpose, vessels of variable capacity corresponding to the normal quantities according to age may be used, and in which the milk would be previously dosed for the different periods of feeding, and would have, preferably, a shape allowing a teat to be formed thereon; in this way, the milk would be presented to babies very easily and in an absolutely sterilized condition.

This apparatus is also utilisable for the drinks (coffee with milk, chocolate, creams, etc.) the main ingredient of which is milk.

By way of example of fruit juice, tomato juice in 1 kilogram vessels treated in a stationary digester or retort needs more than 60 minutes in order that the center of the tin should reach the temperature of the digester. At speeds of rotation of 20 to 40 revolutions per minute, the conditions are improved but the penetration is still slow and irregular. On the contrary at speeds of 60 to 100 revolutions per minute, the penetration is excellent and regular.

Thus with the apparatus described tomato juices can be sterilized in periods varying from about one minute and thirty seconds to 6 minutes according to the speed and the temperature chosen, the juices thus obtained having all the properties of raw juices.

I claim:

1. In an apparatus for thermal treatment of foodstuffs in containers and of the type in which the containers are rolled along guiding tracks in an enclosure having an inlet and containing a treating fluid, the combination of a rotating distributor at the inlet of the enclosure for supplying the same with containers, a brake for retaining the said containers before they enter said rotating distributor, means for periodically acting upon said brake for allowing the entrance without shock of a container into the rotating distributor, guiding tracks for the containers arranged in a closed circuit, propulsion chains arranged to travel through said circuit and propel cylindrical baskets filled with vessels or containers along the guiding tracks by rolling said baskets on the latter, there being means for driving said chains, a rotating outlet distributor located in an effective position along said circuit to be capable of controlling the removal of the baskets from the enclosure, and operative valve means preventing the removal of each basket until after the same has followed the closed circuit fully one time.

2. In an apparatus for thermal treatment of foodstuffs in containers and of the type in which the containers are rolled along guiding tracks in an enclosure having an inlet and containing a treating fluid, the combination of a rotating distributor at the inlet of the enclosure for supplying the same with containers, a brake for retaining said containers before they enter said rotating distributor, means for periodically acting upon said brake for allowing the entrance without shock of a container into the rotating distributor, guiding tracks for the containers arranged in a closed circuit, chains corresponding to the said circuit, pushing members distributed upon the said chains for rolling the containers, said chains being adapted to be continuously driven, a rotating outlet distributor for controlling the removal of the containers from the enclosure, an extracting lever for periodically engaging the containers in said outlet distributor, a slide-block for controlling an opening in front of said outlet distributor, and means for operating said lever and slide-block in order to allow the removal of each container only when the same has followed the closed circuit more than one time.

3. In an apparatus for thermal treatment of foodstuffs in containers and of the type in which the containers are rolled along guiding tracks in an enclosure having an inlet and containing a treating fluid, the combination of a rotating distributor at the inlet of the enclosure for supplying the same with containers, a brake for retaining said containers before they enter said rotating distributor, means for periodically acting upon said brake for allowing the entrance without shock of a container into the rotating distributor, guiding tracks for the containers arranged in a closed circuit, propulsion chains arranged to travel through said circuit and propel cylindrical baskets filled with vessels or containers along the guiding tracks by rolling said baskets thereon, said chains being adapted to be continuously driven, a rotating outlet distributor for controlling the removal of the containers from the enclosure, an extracting lever for periodically engaging the containers in said outlet distributor, a slide-block for controlling an opening in front of said outlet distributor, and means for operating said lever and slide-block in order to allow the removal of each container only when the same has followed the closed circuit more than one time.

4. In an apparatus for the sterilization and cooling under pressure of foodstuffs in containers, the combination of a sterilizing enclosure containing a hot liquid under pressure, a cooling enclosure containing a cold liquid under pressure, guiding tracks arranged in individual closed circuits in said enclosures, means for rolling the containers along said tracks, a fluid-tight inlet distributor for supplying the containers into the sterilizing enclosure, a pipe connecting the upper parts of said enclosures which are at the same pressure and allowing the containers to pass from the sterilizing enclosure into the cooling enclosure, a distributor in the sterilizing enclosure at the inlet portion of said pipe, operative means preventing a container from entering the said pipe until after it has followed the closed circuit fully one time, a distributor in the cooling enclosure at the outlet of the connecting pipe for supplying the guiding tracks in the said cooling enclosure with containers, and a fluid-tight rotating distributor immersed in the liquid of the cooling enclosure adapted to allow the escape of one container at a time and for introducing air into said cooling enclosure.

PIERRE CARVALLO.